April 10, 1934.  A. N. BECKER ET AL  1,954,235
COMBINATION COOKING DEVICE
Filed Sept. 20, 1930  2 Sheets-Sheet 2
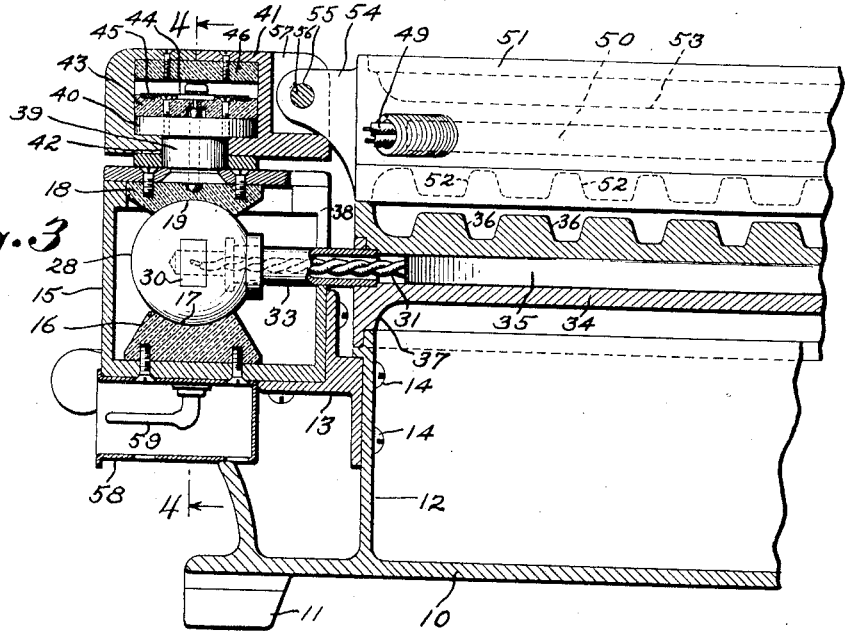
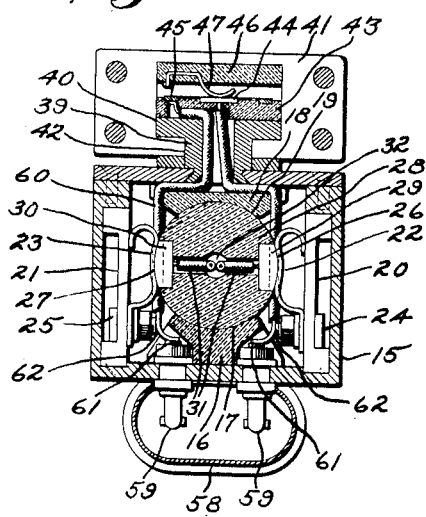
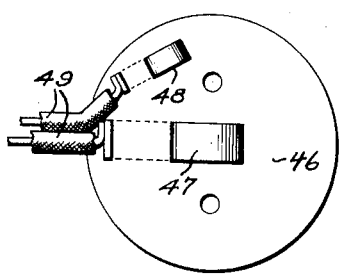
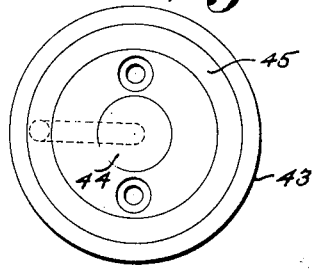
Inventors
Alfonse N. Becker
John F. Martin
By Morsell & Morsell
Attorneys Patented Apr. 10, 1934

1,954,235

UNITED STATES PATENT OFFICE 1,954,235

COMBINATION COOKING DEVICE

Alfonse N. Becker, Milwaukee, and John F. Martin, Kenosha, Wis.

Application September 20, 1930, Serial No. 483,162

3 Claims. (Cl. 219—19)

This invention relates to improvements in combination cooking devices.

In recent years, electric waffle irons, grills, and the like have come into common use in the home and restaurant. These devices, however, in almost all cases, have each been limited to a single use, and in order to cook waffles and pancakes, or waffles and eggs at the same time, it has been necessary to have a separate waffle iron and a separate electric plate suitable for cooking the other food items. This was troublesome and dual equipment increased expense.

It is therefore one of the objects of this invention to provide an improved combination cooking device which is adapted for cooking waffles and any other food item such as eggs, bacon and the like at the same time, and which may also be readily converted from a waffle iron into a cooking device having two cooking surfaces which may be used when a larger number of pancakes, eggs, bacon and the like are desired.

A further object of this invention is to provide a combination cooking device in which the heating unit of each plate is substantially equally spaced from the upper and lower surfaces thereof to render both of said surfaces equally effective for cooking purposes at the same time.

A further object of this invention is to provide a cooking device of the waffle iron type in which the upper plate is mounted for pivotal movement in a horizontal plane and in which the lower plate is so mounted as to permit reversal of its sides.

A further object of this invention is to provide an electrical cooking device having a novel arrangement of electrical contacts which permit the above-mentioned movement of the upper and lower plates to different cooking positions without interfering with the flow of current to the heating coils within said plates.

A further object of this invention is to provide a combination cooking device which is relatively simple in construction, strong and durable, attractive in appearance, efficient in operation, and well adapted for the purposes described.

With the above and other objects in view, the invention consists of the improved combination cooking device and its parts and combinations as set forth in the claims, and all equivalents thereof.

In the accompanying drawings illustrating one complete embodiment of the preferred form of the invention, in which the same reference numerals designate the same parts in all of the views;

Fig. 3 is an enlarged detail view of the rear portion of the device showing the electrical contacts, parts being broken away and parts being shown in section;

Fig. 4 is a sectional view taken on line 4—4 of Fig. 3;

Fig. 5 is an enlarged bottom view of the upper contact disc in connection with the swivel joint of the upper plate; and Fig. 6 is an enlarged plan view of the lower contact disc.

Figure 1:
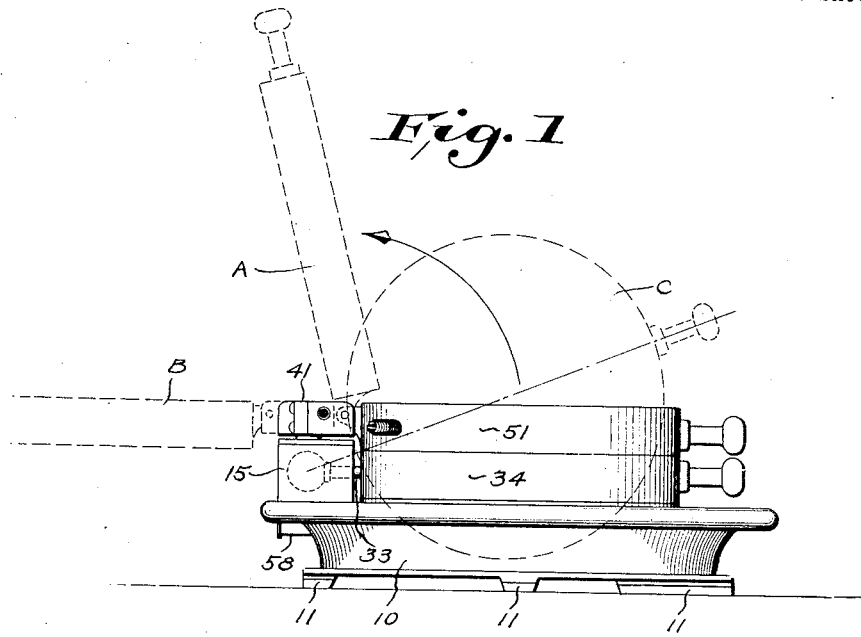
Fig. 1 is a side elevation of the device, the dotted lines indicating various positions of movement of the upper and lower plates.
Figure 2:
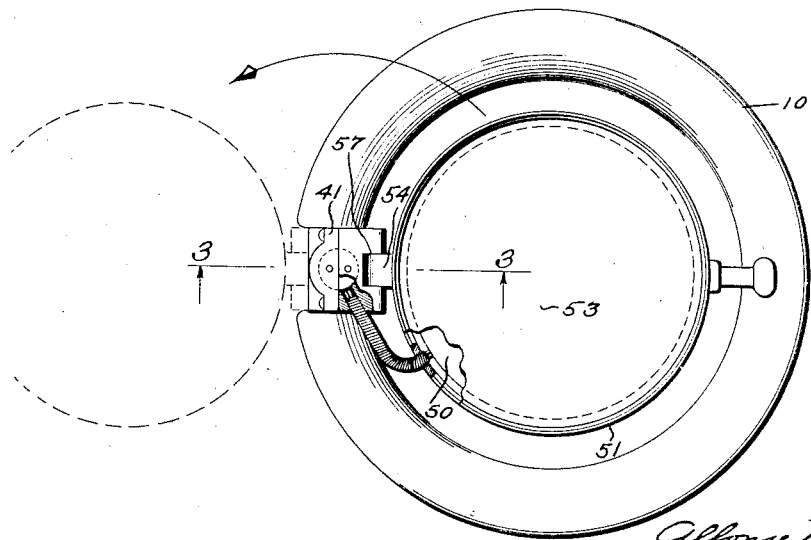
Fig. 2 is a plan view thereof, the dotted lines indicating an alternate position of the upper plate.

Referring to the drawings the numeral 10 designates a tray or support having legs 11, the front leg being of substantial width and being preferably weighted to hold said front in position. The tray 10 has its upper surface formed with an annular flange 12 which forms a rest for the lower plate. A bracket 13 has one side secured to the rear of the flange 12 as at 14 and has its other side secured to a lower box-like housing 15 for the electrical contacts of the lower plate.

Supported on the inner side of the lower wall of the housing 15 is a section of fibrous or insulating material 16 having a concave upper surface 17. A similar section of insulating material 18 having a concave lower surface 19 depends from the upper wall of the housing 15. Flat insulating pieces 20 and 21 are fitted adjacent opposite sides of the housing. Contact members 22 and 23 are secured by bolts 24 and 25 respectively to the sides of said insulating sections 20 and 21. Said contact members are also formed with concave side portions 26 and 27.

A ball 28 is rotatably mounted between the concave surfaces 17, 19, 26 and 27 and is provided on opposite sides with metallic contact sections 29 and 30 which are adapted to frictionally engage the contacts 22 and 23.

Wires 31 within the ball 28 have their ends secured to the contact portions 29 and 30 and extend through a central aperture 32 of the ball, through a tubular extension 33 of the latter, and into the interior of a lower cooking plate 34.

The plate 34, which is formed of cast iron, aluminum, or any other suitable material, is rigidly secured to the end of the tubular extension 33 of the ball. Said plate is provided with a heating unit preferably in the form of a coil 35 which is positioned substantially midway between the two surfaces of the plate. One surface of the plate is formed with waffle molds 36 therein and the other surface is of flat form with flanged sides 37. The front and a portion of the top of the housing 15 is slotted as at 38 to permit movement of the tubular extension 33 and resulting movement of the lower plate for a purpose to be hereinafter described.

A tubular post 39 extends upwardly from the top of the housing 15 and said post is formed with an enlarged upper portion or disc 40. An upper housing or plate supporting member 41 has a lower bore 42 through which the post 39 extends and has an interior chamber within which the disc 40 is received, the housing 41 being thereby pivotal on the post 39. The upper surface of the disc 40 carries an insulating disc 43 (see Fig. 6) and said disc has a central contact portion 44 and an outer contact ring 45. Rigidly secured to the upper wall of the chamber within the housing 41 is an upper disc 46 also of insulating material. Said disc has depending therefrom contacts 47 and 48 which are adapted to frictionally engage the contacts 44 and 45 respectively of the lower disc 43. Wires 49 have one end secured to the contacts 47 and 48 and have their other ends secured to a heating unit 50 within an upper cooking plate 51.

The cooking plate 51 is constructed similarly to the lower cooking plate 34 and is provided with waffle molds 52 on one side and with a dished cooking surface 53 on its other side, the heating unit 50 being positioned within the interior of the plate substantially equi-distant from the two cooking surfaces thereof. The rear portion of the upper plate 51 has a depending lug 54 having a bore 55 through which a bolt 56 loosely extends. Said bolt extends across a bifurcated portion 57 of the front of the housing 41. The upper plate 51 is thus mounted so that it can be swung up and down and so that it may be pivoted in a horizontal plane through rotation of the housing 41 on the post 39.

A socket 58 depends from the lower wall of the housing 15 and said socket is adapted to receive the usual electric plug, the latter engaging contact members 59 within the socket. Wires 60 have their lower ends secured in contact with contact members 59 as at 61 and with the bolts 24 and 25 of the contacts 22 and 23 as at 62. Said wires extend through the chamber within the lower contact housing, through the interior of the post 39, and have their upper ends secured to the contacts 44 and 45 of the disc 43.

When a plug is inserted in the socket 58 current will pass through the members 59, through the bolts 24 and 25, to the contacts 22 and 23. From the latter the current will pass to the contacts 29 and 30 on the ball, through the wires 31, to the heating coil 35 of the lower cooking plate. The current will at the same time pass through the wires 60 to the contacts 44 and 45 on the disc 43. Inasmuch as said contacts are engaged by the contacts 47 and 48 of the upper disc 46, the current will pass to the wires 49 and to the heating coil 50 of the upper cooking plate.

When the device is in the position shown by full lines in Figs. 1 and 3, a waffle may be cooked between the plates and pancakes, eggs, bacon or the like may be simultaneously cooked on the surface 53 of the upper plate. To remove the waffle the upper plate is swung on the bolt 56 to position A of Fig. 1. If it is not desired to cook waffles and if two flat cooking surfaces are necessary, the upper plate is pivoted horizontally through movement of the housing 41 on the post 39 to position B of Fig. 1, and the lower plate is reversed in position through rotation of the ball 28 within the concave surfaces, said reversal of position being indicated by position C of Fig. 1.

Inasmuch as the contacts 47 and 48 of the disc 46 are always in engagement with the contacts 44 and 45 of the disc 43, there will be a flow of current to the heating coil of the upper plate in all positions of adjustment. When the lower plate is swung to a midway position as at C in Fig. 1, the contacts 29 and 30 will be out of engagement with the contacts 22 and 23, but as soon as said plate assumes a horizontal position with either side up, there will be a flow of current to the heating unit therein.

Although only one form of the invention has been shown and described, it is not desired to be limited to this exact showing as the broad concept of the invention includes all changes and modifications as may come within the scope of the claims.

What we claim is:

1. A cooking device comprising a supporting portion, a lower plate carrying a heating unit and having upper and lower unlike cooking surfaces, a swivel connection between said lower plate and the supporting portion to provide for independent reversal of said plate to expose either cooking surface thereof, an upper plate also carrying a heating unit and having upper and lower unlike cooking surfaces, and a connection between said upper plate and the supporting portion to provide for raising and lowering of the plate and for pivotal movement thereof in a horizontal plane independently of the lower plate.

2. An electrical cooking device comprising a supporting portion, a lower plate carrying an electrical heating unit and having upper and lower unlike cooking surfaces, a swivel connection between the lower plate and the supporting portion to provide for independent reversal of said plate to expose either cooking surface thereof, an upper plate also carrying a heating unit and having upper and lower unlike cooking surfaces, a connection between said upper plate and the supporting portion to provide for raising and lowering of the plate and for pivotal movement thereof in a horizontal plane independently of the lower plate, and means for transmitting electrical current from an outside source to the heating units of the two plates without interfering with the movement thereof.

3. An electrical cooking device comprising a supporting portion, a lower plate carrying an electrical heating unit and having upper and lower unlike cooking surfaces, a swivel connection between the lower plate and the supporting portion to provide for independent reversal of said plate to expose either cooking surface thereof, an upper plate also carrying a heating unit and having upper and lower unlike cooking surfaces, a connection between said upper plate and the supporting portion to provide for raising and lowering of the plate and for pivotal movement thereof in a horizontal plane independently of the lower plate, and means including wiper contacts in the swivel and universal connections for transmitting electrical current from an outside source to the heating units of the two plates without interfering with the movement thereof.

ALFONSE N. BECKER.
JOHN F. MARTIN.